(12) United States Patent
Standke et al.

(10) Patent No.: US 6,534,667 B1
(45) Date of Patent: Mar. 18, 2003

(54) WATER-BASED COMPOSITION OF AMINO-FUNCTIONAL SILICON COMPOUNDS

(75) Inventors: Burkhard Standke, Lörrach (DE); Roland Edelmann, Wehr (DE); Albert-Johannes Frings, Rheinfelden (DE); Michael Horn, Rheinfelden (DE); Peter Jenkner, Rheinfelden (DE); Ralf Laven, Schwörstadt (DE); Helmut Mack, Rheinfelden (DE); Jaroslaw Monkiewicz, Rheinfelden (DE); Günter Switalla, Neunkirchen-Seelscheid (DE)

(73) Assignee: Degussa- AG, Duesseldorf (DE)

( * ) Notice: Subject to any disclaimer, the term of this patent is extended or adjusted under 35 U.S.C. 154(b) by 0 days.

(21) Appl. No.: 09/514,356

(22) Filed: Feb. 28, 2000

(30) Foreign Application Priority Data

Feb. 27, 1999 (DE) .......................................... 199 08 636

(51) Int. Cl.$^7$ ................................ C07F 7/08; C07F 7/10
(52) U.S. Cl. .................. 556/413; 427/331; 106/287.11
(58) Field of Search ........................ 556/413; 427/331; 106/287.11

(56) References Cited

U.S. PATENT DOCUMENTS

| 5,206,285 A | 4/1993 | Castellucci |
| 5,629,400 A | 5/1997 | Standke et al. |
| 5,679,147 A | 10/1997 | Standke et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 6,054,601 A | 4/2000 | Standke et al. |

FOREIGN PATENT DOCUMENTS

EP 0 716 128 6/1996

*Primary Examiner*—Paul F. Shaver
(74) *Attorney, Agent, or Firm*—Oblon, Spivak, McClelland, Maier & Neustadt, P.C.

(57) ABSTRACT

A composition which comprises a mixture of water-soluble, amino-functional silicon compounds which are essentially free from alkoxy groups, water, optionally a content of alcohol and optionally a content of acid, the composition comprising silicon compounds of the general formula I:

$$NH_2[CH_2)_2NH]_x(CH_2)_3SiO_{1.5} \qquad (I)$$

in which x is 0, 1 or 2,
and of the general formula II:

$$(SiO_{1.5}(CH_2)_3[NH(CH_2)_2]_y NH[(CH_2)_2NH]_z(CH_2)_3Si)_{1.5} \qquad (II)$$

in which y and z are 0, 1 or 2 and are identical or different. The compositions are obtainable by mixing corresponding aminoalkoxy silanes, hydrolyzing the mixture and removing the hydrolysis alcohol formed as a result. The invention furthermore relates to a process for the preparation of the compositions and to their use in a wide variety of applications.

29 Claims, No Drawings

WATER-BASED COMPOSITION OF AMINO-FUNCTIONAL SILICON COMPOUNDS

BACKGROUND OF THE INVENTION

1. Field of the Invention

The present invention relates to a composition which comprises a mixture of water-soluble, amino-functional silicon compounds which are essentially free from alkoxy groups, water, optionally a low content of alcohol and optionally a content of acid. Such compositions moreover are free from solvents, water and alcohols being excluded from the amount of solvent.

2. Description of the Related Art

Amino silanes are known as water-soluble adhesion promoters. Water-based compositions with multi-functional organopolysiloxanes are also known as adhesion promoters, cf. EP 0 716 128 A2. In these systems, the reason for the improvement in the water-solubility is essentially attributed to the amino-functional groups.

A number of further fields of application for amino-functional silanes or siloxanes are:

The use in coating systems, in the field of corrosion protection, for biocidal treatment of surfaces, in the treatment of wood, in the preparation of electro-photographic toners, as a constituent in amino-silicone fluids (U.S. Pat. No. 5,077,421), as a constituent in epoxy resins [Chemical Abstracts (1991)—CA 114: 83579s] for the preparation of organically modified glasses (EP 0 223 987 A2), as an anticancer agent [Chemical Abstracts (1983)—CA 99: 133650c], for modification of glass surfaces and glass fiber surfaces in wastewater treatment for the treatment of pigments, as a constituent in catalysts and for the preparation thereof (U.S. Pat. No. 4,053,534) and as a flocculating agent, to mention only a few examples.

It is moreover known to employ amino-functional partly hydrolyzed alkoxy silane oligomers to reduce the formation of agglomerates in inorganic powders. U.S. Pat. No. 5,543,173 thus discloses that such formulations also comprise considerable amounts of alcohol, and moreover said silane oligomers can also liberate significant amounts of hydrolysis alcohol Since amino silanes, such as, for example, aminopropyltriethoxysilane or aminopropyltrimethoxy-silane, are water-soluble, they allow a water-based application, for example in aqueous glass fiber sizes. Also, the formation of alcohols which occurs on hydrolysis also has an adverse effect. For example, on aqueous application of aminopropyltriethoxysilane, ethanol is formed as a hydrolysis product to the extent of about 62% of the weight of silane employed. As a combustible, water-soluble liquid, ethanol reduces the flash point of such application solutions, which in general necessitates the use of expensive, explosion-proof apparatuses.

Another disadvantage of alcohol-containing solutions is the fact that for ecological and work safety reasons, the solvent alcohol must be removed by sometimes very expensive industrial procedures.

Aminoalkoxysilanes can form a maximum of one silanetriol group per molecule upon hydrolysis. Silanols and other silanol functions can crosslink with one another or with other OH functions, for example with OH functions of a substrate or of dissolved, emulsified or suspended monomeric or polymeric substances. Such OH functions could be, for example, silanol functions on silic, glass, mineral, glass fiber or mineral fiber surfaces, OH functions on cellulose, leather, paper, wood and the like, and also OH functions on metal surfaces or metal oxide surfaces and also OH functions on the surface of plastics or polymers in formulations, for example emulsions or dispersions of naturally occurring substances or plastics. To achieve a higher crosslinking density and possibly associated therewith an improvement in the use properties, two silanetriol units per molecule, for example, would be desirable. Two silanetriol units per molecule are obtained on hydrolysis of bis (trialkoxysilylalkyl)amines. However, aqueous solutions of such compounds are not stable. They tend to gel and flocculate out and therefore are not capable of application.

SUMMARY OF THE INVENTION

It is an object of the present invention to provide a water-based composition which comprises (bis) trihydroxysilylalkyl)amines or siloxanes derived therefrom, has the lowest possible content of alcohol, furthermore is free from solvents, and comprises silicon compounds which are essentially free from alkoxy groups.

The object of the invention may be accomplished with a composition, which comprises a mixture of (a) water-soluble, amino-functional silicon compounds which are essentially free from alkoxy groups represented by the formula (I) and (II):

$$NH_2[(CH_2)_2NH]_x(CH_2)_3SiO_{1.5} \quad (I)$$

$$(SiO_{1.5})(CH_2)_3[NH(CH_2)_2]_yNH[(CH_2)_2NH]_x(CH_2)_3SiO_{1.5} \quad (II)$$

wherein
x is 0, 1 or 2, and
y and z are each independently 0, 1 or 2, and (b) water, It has been found, surprisingly, that a low-viscosity, generally, largely storage-stable composition which comprises a mixture of water-soluble, amino-functional silicon compounds which are essentially free from alkoxy groups, water, optionally a low content of alcohol and optionally a content of acid is obtainable by mixing at least one amino silane of the general formula III:

$$NH_2[(CH_2)_2NH]_x(CH_2)_3Si(OR)_3 \quad (III)$$

where
x is 0, 1 or 2, and R is a linear or branched alkyl group having 1 to 4 C atoms,
and/or condensation products thereof, and
at least one amino silane of the general formula IV:

$$(RO)_3Si(CH_2)_3[NH(CH_2)_2]_yNH[(CH_2)_2NH]_z(CH_2)_3Si(OR)_3 \quad (IV)$$

where y and z are 0, 1 or 2 and are identical or different, and R is a linear or branched alkyl group having 1 to 4 C atoms,
and/or condensation products thereof,
adding water and optionally acid, carrying out hydrolysis and removing essentially all of the hydrolysis alcohol produced. Condensation products of amino silanes of the general formula III or IV are understood as meaning those dimeric, trimeric, tetrameric or higher oligomeric products which as a rule are obtainable by condensation and/or pre-hydrolysis of the particular monomers, alcohol being split off.

The inventive composition moreover is usually obtained in a liquid form which is easy to apply, and is generally essentially free from solvent. When the composition according to the invention is used, because of the silicon compounds of the general formulae I and II contained therein, a higher crosslinking density in the polymeric cured siloxane structure and a significant improvement in the mechanical, chemical and thermal properties of treated substances, for example composite materials, such as, for example, glass fiber- and mineral fiber-reinforced plastics, paints and coatings and polymers with a filler content, can be achieved.

The composition according to the invention can also suitably be diluted with water in any ratio, no additional hydrolysis alcohol being formed. Generally, the present composition is stable to storage in an outstanding manner for more than 12 months.

A more complete appreciation of the invention and many of the attendant advantages thereof will be readily obtained as the same becomes better understood by reference to the following detailed description.

DETAILED DESCRIPTION OF THE INVENTION

The composition of the invention may contain alcohol, acid, or both alcohol and acid. The composition according to the invention preferably has a content of alcohol of less than 5% by weight, particularly preferably less than 1% by weight, especially preferably from 1 ppm by weight to 0.5% by weight. In particular, such a composition can comprise methanol and/or ethanol as the alcohol.

The composition according to the invention furthermore has a content of silicon compounds of less than 60% by weight, preferably less than 50% by weight, and the content of silicon compounds is particularly preferably 0.1 to 40% by weight, and especially preferably 0.5 to 40% by weight.

The weight ratio here of the silicon compounds of the general formula I and of the general formula II in a composition according to the invention is suitably I/II$\geq$1, the general formulae I and II including the silanols and siloxanes in each case in equilibrium thereto, as will be readily appreciated by those skilled in the art. The weight ratio of silicon compounds of the general formula I and of the general formula II is preferably I:II=1 to 100:1 particularly preferably I:II=1.5 to 30:1, and especially preferably I:II 1.5 to 4.5:1.

To further improve the stability of a composition according to the invention, in particular the stability of dilute solutions or solutions which comprise a high content of compounds of the general formula II, so-called "bis products", the pH can be adjusted by addition of an organic or inorganic Brönsted acid. Hydrogen chloride, nitric acid, sulfuric acid, formic acid, acetic acid and propionic acid, for example, can be used for this purpose.

The pH of a composition according to the invention can be in the range from 1 to 14. It is suitably at a value<11, preferably in the range from 4 to 9.

The present invention also relates to the process for the preparation of a composition which comprises a mixture of water-soluble amino-functional silicon compounds which are essentially free from alkoxy groups, water, optionally a content of alcohol and optionally a content or acid, which comprises mixing at least one amino silane of the general formula III:

$$NH_2[(CH_2)_2NH]_x(CH_2)_3Si(OR)_3 \qquad (III)$$

in which x is 0, or 2, and R is a linear or branched alkyl group having 1 to 4 C atoms, and/or condensation products thereof,
and at least one amino silane of the general formula IV:

$$(RO)_3Si(CH_2)_3[NH(CH_2)_2]_yNH[(CH_2)_2NH]_z(CH_2)_3Si(OR)_3 \qquad (IV)$$

in which y and z are 0, 1 or 2 and are identical or different and R is a linear or branched alkyl group having 1 to 4 C atoms,
and/or condensation products thereof,
adding water and optionally acid, carrying out hydrolysis and essentially removing the hydrolysis alcohol.

It has been found that at a weight ratio of the starting materials of the formula III and IV of III/IV<1, gel formation or a very severe clouding occur, and as a result can counteract a particularly advantageous application Starting materials of the general formula ill and of the general formula IV are suitably employed in the process according to the invention in a weight ratio of III/IV of$\geq$1, preferably with a weight ratio of III:IV=1 to 100:1; particularly preferably with a weight ratio of III:IV=1.5 to 30:1, and especially preferably with a weight ratio of III:IV=1.5 to 4.5:1.

Water-based, alcohol-free—apart from residual amounts—solutions which comprise bis (trihydroxysilylalkyl)-amines or corresponding oligomeric or polymeric siloxanes of the general formula II are thus now also accessible. In the process according to the invention, amino silanes of the general formula III which are preferably employed include $H_2N(CH_2)_3Si(OCH_3)_3$ (AMMO),
$H_2N(CH_2)_3Si(OC_2H_5)_3$ (AMEO),
$H_2N(CH_2)_2NH(CH_2)_3Si(OCH_3)_3$ (DAMO),
$H_2N(CH_2)_2NH(CH_2)_2NH(CH_2)_3Si(OCH_3)_3$ (TRIAMO),
and compounds according to formula IV which are preferably employed include
$(H_3CO)_3Si(CH_2)_3NH(CH_2)_3Si(OCH_3)_3$ (Bis-AMMO),
$(H_5C_2O)_3Si(CH_2)_3NH(CH_2)_3Si(OC_2H_5)_3$ (Bis-AMEO),
$(H_3CO)_3Si(CH_2)_3NH(CH_2)_2NH(CH_2)_2NH(CH_2)_3Si(OCH_3)_3$ (Bis-DAMO),
$(H_3CO)_3Si(CH_2)_3NH(CH_2)_2NH(CH_2)_2NH(CH_2)_2NH(CH_2)_2NH(CH_2)_3Si(OCH_3)_3$ (Bis-TRIAMO)

However, it is also possible to employ corresponding compounds with other alkoxy groups, and methoxy and ethoxy groups are preferred as hydrolyzable groups. Mixtures with in each case more than one of the compounds of the general formulae III and IV can furthermore employed.

The amino silanes of the general formula III can also be in cyclized form, cf. formula V, and can be employed as such in the process according to the invention. In the present case, compounds of the general formula V are also counted among those of the general formula III:

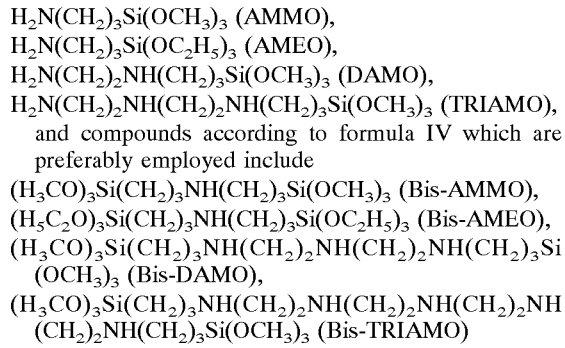

where R methyl, ethyl, propyl or butyl, and
x=0, 1 or 2.

It is known that such a ring is opened on hydrolysis or alcoholysis and the corresponding aminoalkylalkoxy-silane or -silanol is obtained.

Compounds of the general formula IV can likewise be in cyclic or bicyclic form and can be employed as such as in the process according to the invention.

In general, the process according to the invention is carried out by mixing amino silanes of the general formula III and IV, hydrolyzing them together and removing the resulting hydrolysis alcohols by distillation. Mixing of the alkoxy silanes can be carried out in a temperature range between the solidifying point and boiling point of the silanes employed. Generally, water is added in excess to the silane mixture for carrying out the hydrolysis.

The concentration of the silanes in the aqueous solution is suitably adjusted to a value of <60% strength by weight, preferably <50% strength by weight, particularly preferably is 0.01 to 40% by weight, and especially preferably 0.5 to 40% by weight. Deviation from these parameters can cause gel formation or severe clouding. Alcohol is formed on hydrolysis the alkoxy silanes.

In general, the hydrolysis can be carried out at a temperature in the range from 0 to 100° C. The hydrolysis is preferably carried out at a temperature of <100° C., particularly preferably at <90° C., and especially preferably at <60° C. Generally, good thorough mixing is provided here, for example by stirring.

In the process according to the invention, the hydrolysis is suitably carried out at a pH in the range from 4 to 12. An acid or base can furthermore be added to the silane mixture or silane mixture/water system or the already hydrolyzed system to establish the pH.

Preferably, at least one Brönsted acid is added in the process according to the invention. If necessary, a Brönsted base can also be added, for example potassium hydroxide solution, sodium hydroxide solution and ammonia or amines, to name only a few. Hydrochloric acid, sulfuric acid, nitric acid, perchloric acid, formic acid, acetic acid and/or propionic acid are particularly preferred as the acid.

In the process according to the invention, the concentration of hydrolysis alcohol is furthermore lowered by distillation, the distillation preferably being carried out at a temperature of <90° C., particularly preferably at <60° C., and suitably under reduced pressure.

The distillation can advantageously be carried out via a distillation column and can be continued until no further alcohol can be detected at the top of the column, the desired product, which can optionally be worked up further, being obtained at the bottom. If clouding substances should occur, these can be removed from the product by means of filtration, sedimentation, centrifugation or similar standard processes.

The composition according to the invention can be applied from concentrated solution or a solution diluted with water. In the case of dilution with water, the storage stability of the composition diluted in this way can be improved by addition of acid. The pH of the diluted composition is suitably adjusted to a value of <9.

The products obtained according to the invention have the advantage in particular that they are water-soluble, can be mixed with water spontaneously in all proportions, comprise a high content of bis(trihydroxysilylalkyl)amine and siloxanes derived therefrom, and are essentially alcohol-free.

Compositions according to the invention are furthermore used in an outstanding manner as water-soluble adhesion promoters, as a constituent in coating systems and in anti-corrosion compositions, in particular in the coating of metal, for the biocidal treatment of surfaces, the treatment of wood, for electro-photographic toners, as a constituent in amino-silicone fluids, as a constituent in epoxy resins, phenolic resins, unsaturated polyester resins (UP resins) and acrylic resins, as a constituent in organically modified glasses, for pharmaceutical and cosmetic products, for the modification of surfaces of glass and minerals and glass fiber and mineral fiber surfaces, including glass beads, glass fabric and construction glass fabric, to name only a few examples, for wastewater treatment, for the treatment of pigments, as a constituent in the preparation of catalysts, as a flocculating agent, as a constituent in paints and coatings, in the preparation of artificial stone, for increasing the strength of plate glass, hollow glass and laminated glass, and as an adhesion promoter for crosslinking polymers, in particular acrylic compounds, on glass and other substrates. Accordingly, an important use of the inventive composition is a process for coating a surface comprising applying the inventive composition to the surface to be coated.

EXAMPLES

Having generally described this invention, a further understanding can be obtained by reference to certain specific examples which are provided herein for purposes of illustration only and are not intended to be limiting unless otherwise specified.

Example 1

Preparation of an alcohol-free mixture of 80% of AMEO and 20% of "biscyclo-AMBO+bis-AMEO" (called high-boiling agent in the following) as a 40% strength solution in water.

Apparatus:

4 L stirred reactor with a distillation device, internal thermometer, metering device, bridge distillation, vacuum pump and pressure gauge.

120 g of high-boiling agent are mixed with 480 g of AMBO. 1250.0 g of water are initially introduced into the stirred reactor. The amino silane mixture is added via the metering device in the course of 30 to 40 minutes. During this addition, the temperature rises from room temperature to about 50° C. The mixture is stirred at 50° C. for 3 hours. Thereafter, about 450 g of an ethanol/water mixture are distilled off (T: 39 to 41° C., p: 130 to 100 mbar, about 70% by weight of ethanol, about 30% by weight of water). At the end, the end product is adjusted with water to a weight of 1,500 g (40% strength by weight of "silanes" in water).

Clouding of the product can be improved via a customary suction filter. The residue on the filter is less than 0.2% by weight of the total amount of product After filtration, the clouding is 3 to 4 TE/F (DIN/EN 27 027).

The end product is stable to storage for more than 12 months.

Example 2

Preparation of an alcohol-free mixture of 80% of AMBO and 20% of "biscyclo-AMEO+bis-AMEO" (called high-boiling agent in the following) as a 50% strength solution in water.

Apparatus:

4 L stirred reactor with a distillation device, internal thermometer, metering device, bridge distillation, vacuum pump and pressure gauge.

120 g of high-boiling agent are mixed with 480 g of AMEO. 1050 9 of water are initially introduced into the stirred reactor. The amino silane mixture is added via the metering device in the course of 30 to 40 minutes. The mixture is stirred at 50° C. for 3 hours. Thereafter, about 450 g of an ethanol/water mixture are distilled off (T: 39 to 41° C., p: 130 to 100 mbar, about 70% by weight of ethanol, about 30% by weight of water). At the end, the end product is adjusted with water to a weight of 1,200 g (50% strength by weight of "silanes" in water).

Clouding of the product can be improved via a customary suction filter. The residue on the filter is less than 0.5% by weight of the total amount of product. After filtration, the clouding is <10 TE/F (DIN/EN 27 027).

Example 3

Preparation of an alcohol-free mixture of 60% of AMEO and 40% of "biscyclo-AMEO+bis-AMEO" (called high-boiling agent below) as a 10% strength solution in water
Apparatus:
4 L stirred reactor with a distillation device, internal thermometer, metering device, bridge distillation, vacuum pump and pressure gauge.
120 g of high-boiling agent are mixed with 180 g of AMEO. 2000 g of water are initially introduced into the stirred reactor. The amino silane mixture is added via the metering device in the course of 30 to 40 minutes and the pH is then brought to 6 with formic acid. During this operation the temperature rises from room temperature to about 50° C. The mixture is stirred at 50° C. for 3 hours. Thereafter, about 500 g of an ethanol/water mixture are distilled off (T: 35 to 41 ° C., p: 130 to 100 mbar). At the end, the end product is brought to a weight of 3000 g with water (10% strength by weight of "silanes" in water).
The clouding of the product can be improved via a customary suction filter. The residue on the filter is less than 0.5% by weight of the total amount of product. After filtration, the clouding is <10 TE/F (DIN/EN 27 027).

Example 4

Preparation of an alcohol-free mixture of 83% of DAMO and 17% of "biscyclo-DAMO+bis-DAMO" (called high-boiling agent below) as a 40% strength solution in water.
Apparatus:
4 L stirred reactor with a distillation device, internal thermometer, metering device, bridge distillation, vacuum pump and pressure gauge.
102 g of high-boiling agent are mixed with 498 g of DAMO. 1090 g of water are initially introduced into the stirred reactor. The amino silane mixture is added via the metering device in the course of 30 to 40 minutes and the pH is then brought to 6 with formic acid (260 g) During this operation, the temperature rises from room temperature to about 50° C. The mixture is stirred at 50° C. for 3 hours. Thereafter, about 450 g of an ethanol/water mixture are distilled off (T: 39 to 41° C., p: 130 to 100 mbar). At the end, the end product is brought to a weight of 1500 g with water (40% strength by weight of "silanes" in water).
The clouding of the product can be improved via a customary suction filter. The residue on the filter is less than 0.5% by weight of the total amount of product. After filtration, the clouding is <10 TE/F (DIN/EN 27 027).

Example 5

Preparation of an alcohol-free mixture of 80% of TRIAMO and 20% of "biscyclo-TRIAMO+bis-TRIAMO" (called high-boiling agent below) as a 40% strength solution in water.
Apparatus:
4 L stirred reactor with a distillation device, internal thermometer, metering device, bridge distillation, vacuum pump and pressure gauge.
120 g of high-boiling agent are mixed with 480 g of TRIAMO. 1110 g of water are initially introduced into the stirred reactor. The amino silane mixture is added via the metering device in the course of 30 to 40 minutes and the pH is then brought to 6 with formic acid (240 g). During this operation, the temperature rises from room temperature to about 50° C. The mixture is stirred at 50° C. for 3 hours. Thereafter, about 450 g of an ethanol/water mixture are distilled off (T: 39 to 41° C., p: 130 to 100 mbar). At the end, the end product is brought to a weight of 1500 g with water (40% strength by weight of "silanes" in water).
Clouding of the product can be improved via a customary suction filter. The residue on the filter is less than 0.5% by weight of the total amount of product. After filtration the clouding is <10 TE/F (DIN/EN 27 027).

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 19908636.2, filed on Feb. 27, 1999, and incorporated herein by reference in its entirety.

What is claimed is:

1. A composition, which comprises a mixture of
   (a) water-soluble, amino-functional silicon compounds which are essentially free from alkoxy groups represented by the formula (I) and (II):

$$NH_2[(CH_2)_2NH]_x(CH_2)_3SiO_{1.5} \quad (I)$$

$$(SiO_{1.5})(CH_2)_3[NH(CH_2)_2]_yNH[(CH_2)_2NH]_z(CH_2)_3SiO_{1.5} \quad (II)$$

wherein
   x is 0, 1 or 2, and
   y and z are each independently 0, 1 or 2; and
   (b) water.

2. The composition of claim 1, further comprising at least one alcohol.

3. The composition of claim 1, further comprising at least one acid.

4. The composition of claim 1, further comprising at least one alcohol and at least one acid.

5. The composition of claim 1, which has an alcohol content of less than 5% by weight.

6. The composition of claim 1, which has a pH of less than 11.

7. The composition of claim 1, which has a content of silicon compounds of less than 60% by weight.

8. The composition of claim 1, wherein the weight ratio of the silicon compounds represented by formula (I) and formula (II), (I)/(II), is $\geq 1$.

9. The composition of claim 1, which comprises the silicon compounds represented by formula (I) and (II), including the silanols and siloxanes in each case in equilibrium thereto.

10. A process for the preparation of a composition which comprises a mixture of water-soluble, amino-functional silicon compounds which are essentially free from alkoxy groups, water, optionally a content of alcohol and optionally a content of acid, which comprises mixing at least one amino silane represented by formula (III):

$$NH_2[(CH_2)_2NH]_x(CH_2)_3Si(OR)_3 \quad (III)$$

wherein x is 0, 1 or 2, and R is a linear or branched alkyl group having 1 to 4 C atoms
and/or condensation products thereof, and at least one amino silane represented by formula IV:

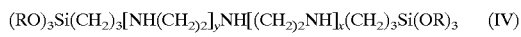

wherein y and z are each independently 0, 1 or 2, and R is a linear or branched alkyl group having 1 to 4 C atoms, and/or condensation products thereof, adding water and, optionally, acid, carrying out hydrolysis, and removing essentially all of the alcohol produced during the hydrolysis.

11. The process of claim 10, wherein the amino silanes represented by formula (III) and (IV) are mixed in a weight ratio, (III)/(IV), of $\geq 1$.

12. The process of claim 10, wherein the hydrolysis is carried out at a temperature of <100° C.

13. The process of claim 10, wherein the hydrolysis is carried out at a pH of 4 to 12.

14. The process of claim 10, wherein at least one Brönsted acid is added as the acid.

15. The process of claim 10, wherein the concentration of the alcohol produced during the hydrolysis is lowered by distillation.

16. The process of claim 10, wherein the pH of the composition is brought to a value of <11.

17. A composition obtainable according to the process of claim 10.

18. A method of treating a surface, comprising applying the composition of claim 1 to the surface.

19. A method according to claim 18, wherein said composition is used as a water-soluble adhesion promoter.

20. A method according to claim 18, wherein said composition is used as a constituent in a coating system.

21. A method according to claim 18, wherein said composition is used as a constituent in an anticorrosion system.

22. A method according to claim 18, wherein said composition is used in the biocidal treatment of surfaces.

23. A method according to claim 18, wherein said composition is used in the treatment of wood.

24. A method according to claim 18, wherein said composition is used in the treatment of an electrophotographic toner.

25. A method according to claim 18, wherein said composition is used as a constituent in epoxy, UP or acrylic resins.

26. A method according to claim 18, wherein said composition is used for the modification of surfaces of glass.

27. A method according to claim 18, wherein said composition is used for the surface modification and treatment of pigments.

28. A method according to claim 18, wherein said composition is used for increasing the strength of plate, hollow or laminated glass.

29. A method according to claim 18, wherein said composition is used as an adhesion promoter for a UV-crosslinking polymer.

* * * * *